(12) United States Patent
Sparks

(10) Patent No.: US 9,760,326 B2
(45) Date of Patent: Sep. 12, 2017

(54) PRINT FACILITATION

(75) Inventor: Brian C. Sparks, Santee, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 192 days.

(21) Appl. No.: 14/373,139

(22) PCT Filed: Mar. 30, 2012

(86) PCT No.: PCT/US2012/031392
§ 371 (c)(1),
(2), (4) Date: Jul. 18, 2014

(87) PCT Pub. No.: WO2013/147834
PCT Pub. Date: Oct. 3, 2013

(65) Prior Publication Data
US 2015/0009536 A1  Jan. 8, 2015

(51) Int. Cl.
*G06F 3/12* (2006.01)

(52) U.S. Cl.
CPC .......... *G06F 3/1268* (2013.01); *G06F 3/1205* (2013.01); *G06F 3/1226* (2013.01); *G06F 3/1229* (2013.01); *G06F 3/1232* (2013.01); *G06F 3/1285* (2013.01); *G06F 3/1289* (2013.01)

(58) Field of Classification Search
CPC .... G06F 3/1268; G06F 3/1232; G06F 3/1226; G06F 3/1289
See application file for complete search history.

(56) References Cited

U.S. PATENT DOCUMENTS

| | | | |
|---|---|---|---|
| 6,453,129 B1 | 9/2002 | Simpson et al. | |
| 6,473,800 B1 * | 10/2002 | Jerger | G06F 21/52 709/224 |
| 8,180,891 B1 * | 5/2012 | Harrison | H04L 63/10 709/224 |
| 9,213,587 B2 * | 12/2015 | Powlette | G06F 9/54 |
| 2002/0059144 A1 * | 5/2002 | Meffert | G06F 21/10 705/51 |
| 2003/0093464 A1 * | 5/2003 | Clough | G06F 8/60 709/203 |
| 2004/0252325 A1 * | 12/2004 | Lawrence | G06F 3/1204 358/1.15 |
| 2007/0064024 A1 | 3/2007 | Silverbrook et al. | |
| 2007/0291302 A1 | 12/2007 | Trappe et al. | |
| 2010/0195143 A1 | 8/2010 | Kanemitsu | |
| 2011/0007347 A1 | 1/2011 | Kamath et al. | |
| 2011/0037995 A1 * | 2/2011 | Wang | G06F 3/1205 358/1.15 |
| 2011/0090535 A1 | 4/2011 | Towata | |
| 2011/0128572 A1 * | 6/2011 | Hosotsubo | G06F 3/122 358/1.15 |

(Continued)

OTHER PUBLICATIONS

International Search Report & Written Opinion received in PCT Application No. PCT/US2012/031392, Nov. 20, 2012, 10 pages.

*Primary Examiner* — Benjamin O Dulaney
(74) *Attorney, Agent, or Firm* — HP Inc. Patent Department

(57) ABSTRACT

Example embodiments disclosed herein relate to facilitation of printing from a web application. An identifier is used to use a is of printers. Print data for one of the printers of the list is sent to a print client based on the list of printers and the identifier.

20 Claims, 4 Drawing Sheets

(56) References Cited

U.S. PATENT DOCUMENTS

| | | | |
|---|---|---|---|
| 2011/0222104 A1* | 9/2011 | Mohammad | G06F 3/1206 358/1.15 |
| 2012/0062946 A1 | 3/2012 | Kitagata | |
| 2012/0218576 A1* | 8/2012 | Sekine | G06F 3/1247 358/1.13 |
| 2012/0300251 A1* | 11/2012 | St. Laurent | H04N 1/00244 358/1.15 |
| 2013/0286425 A1* | 10/2013 | Nakamura | G06F 3/1204 358/1.13 |

* cited by examiner

PRINT FACILITATION

BACKGROUND

People use web browsers as well as additional functionality of web applications embedded within the web browsers. Users may wish to print information from the web applications. Typically, to print from a web application, a user would activate a print button from the web browser. As such, print functionality of the web browser is used to print information from the web application.

BRIEF DESCRIPTION OF THE DRAWINGS

The following detailed description references the drawings, wherein.

DETAILED DESCRIPTION

Figure 1:
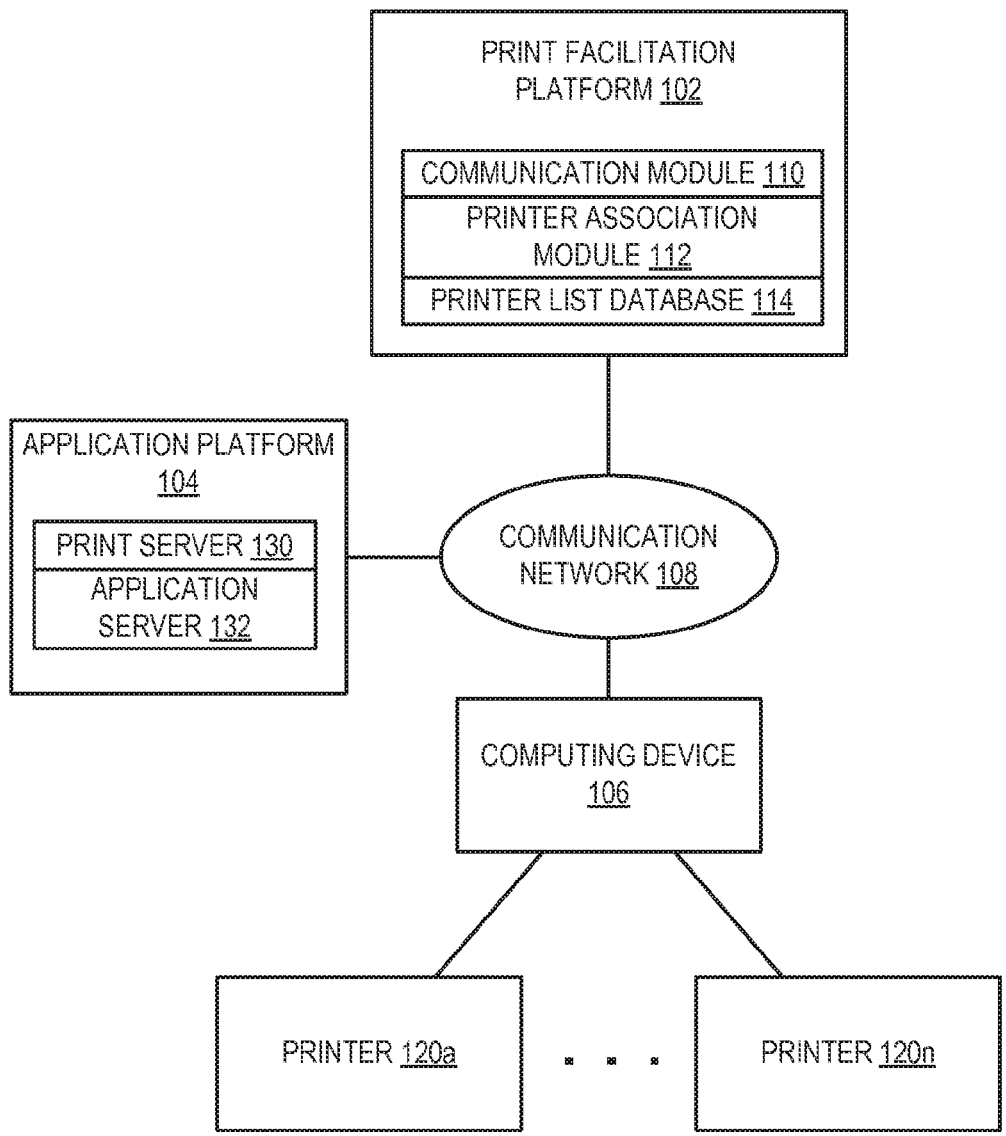
FIG. 1 is a block diagram of a computing system including a print facilitation platform to facilitate printing at a computing device, according to one example.

Printing from websites and web applications can be an issue for consumers. Web applications can be confined to a sandbox in a consumer's web browser. As such, a web application in a sandbox cannot see printers installed at the consumer's device and thus cannot ascertain the capabilities of the printers. Further, browser print models generally do not allow for sufficiently accurate print previews. Moreover, it can be confusing for a consumer to attempt to configure operating system printer options from within the browser sandbox.

Accordingly, various embodiments disclosed herein relate to facilitating a print job of an end user using a web application using a print facilitation plugin in the web browser and a print client module outside of the web browser. This allows the web application to print without using the print sub-system of the web browser and/or operating system prompts.

The print plugin can determine the initiation of a print job associated with a print job identifier at the user's computing device. The print job can be initiated by the web application running in the web browser and the print plugin can be embedded in the web browser. The print job identifier can be sent from the web application (e.g., running on an application server) to a print facilitation platform.

In certain scenarios, if the print plugin is not installed, the user can be prompted to install the print plugin. When the print plugin is installed, a print client program can also be installed on the computing device. The print client program can communicate with the print plugin. Further, because the print client program is outside of the sandbox of the browser, the print client program can access information about printers associated with the computing devices, for example, installed printers, the status of the printers, paper available at the printers, ink types, etc.

When the print job is initiated, the print plugin notifies the print client program of the print job. A print job identifier generated by the web application can also be sent to the print client program. The print client program can send the print job identifier, a list of printers available at the computing device, printer parameters (e.g., paper properties, ink availability, etc.), etc. to a print facilitation platform.

The print facilitation platform can store the printer list and/or any properties associated with the computing device. Further, the print facilitation platform is able to determine the web application associated with the print job from the print job identifier received earlier from the web application. The print facilitation platform can then send the printer list and/or any properties to the web application. The web application can then be used to determine the print job from within the browser sandbox. In one example, the web application can automatically formulate the print job. In another example, the web application can receive input about the print job via the web browser. The input can be, for example, which printer to use, a size to print, etc. The web application can then generate print data for one of the printers on the list. In certain examples, the print data may be shown to the user as a print preview in the browser's sandbox. In some examples, the print data can be formulated in a Printer Command Language (PCL). The print data can be sent to the print facilitation platform for to relay to the printer. The print facilitation platform can then send the print data to the print client program to print the print data on the printer for which the print data was determined for.

FIG. 1 is a block diagram of a computing system including a print facilitation platform to facilitate printing at a computing device, according to one example. The system 100 can include a print facilitation platform 102 that communicates with an application platform 104 and/or a computing device 106 via a communication network 108. In certain examples, the print facilitation platform 102, application platform 104, and/or computing device 106 are computing devices, such as servers, client computers, desktop computers, mobile computers, or combinations thereof. The print facilitation platform 102, application platform 104, and/or the computing device can be implemented via one ore more processing elements, memory, and/or other components.

The print facilitation platform 102 can include a communication module 110, a printer association module 112, and a printer list database 114. In certain embodiments, the components can be broken up into various hardware and/or software components or devices. The communication module 110 can be used to communicate via the communication network 108 and/or via other communications methods. Further, the printer association module 112 can be used to associate a print job associated with a computing device, such as computing device 106 with an application. The association can be based on an identifier, such as a print job identifier or session identifier. The printer list database 114 can be used to store printer names and/or types associated with one or more printers 120a-120n. The print facilitation platform 102 can be used when a user of the computing device 106 uses a web application served by the application platform 104.

In one example, the application platform 104 includes a print server 130 and an application server 132. The print server 130 and/or application server 132 can be considered a hardware device or a program platform running on one or more hardware devices. The application server 132 can be used to provide an application that can be used at the computing device 106 via a web browser or another program. The print server 130 can be used to generate print data that can be transmitted to a printer to print the print data. In certain examples, the print server 130 includes driver information about a plurality of printers. As such, when a printer is selected, the print server is able to generate print data associated with the particular printer. Examples of web applications that may be used to print information include a mapping or direction application, a greeting card application, an informational application, etc. In certain embodiments, one or more functions of the application platform 104 can be performed at a print facilitation platform 102 or vice versa. Further, the print facilitation platform 102 and the application platform 104 may be combined into one platform or implemented on one device.

The communication network 108 can use wired communications, wireless communications, or combinations thereof. Further, the communication network 108 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 108 can be in the form of a direct network link between devices. Various communications structures and infrastructure can be utilized to implement the communication network(s).

By way of example, the print facilitation platform 102, the application platform 104, and computing device 106 communicate with each other and other components with access to the communication network 108 via a communication protocol or multiple protocols. A protocol can be a set of rules that defines how nodes of the communication network 108 interact with other nodes. Further, communications between network nodes can be implemented by exchanging discrete packets of data or sending messages. Packets can include header information associated with a protocol (e.g., information on the location of the network node(s) to contact) as well as payload information.

A user of the computing device 106 may open a web browser and browse to a site including a web application hosted on the application server 132. The user may wish to print while using the web application. The web application can arrive at a state where content should be printed. In one example, the web application can arrive at the state because of input by the user, such as clicking on a print button associated with the web application. In another example, the state can be arrived at based on progression in the web application. For example, if the web application is intended for the printing of a card, the web application can be programmed to arrive at the state after a particular amount of information (e.g., size settings, font, text, etc.) is received. As further detailed in FIG. 2A, a print plugin module can detect the state and launch. The print plugin module can interact with the web application to receive a session identifier associated with the web application use. Further, the print plugin module can tell a print client module outside of the sandbox of the web browser the session identifier. The print client module can then send the session identifier to the print facilitation platform 102 via the communication module 110. The application server 132 can also send a message to the print facilitation platform 102 that it should be associated with the session identifier.

Moreover, the print client module can determine a list of printers accessible to the computing device 106. This can include printers that are installed at the computing device. Further, information about the type of each printer can be determined for the list. Additional information may be gathered for the list, such as status information of the respective printers. The printer list can be transmitted to the print facilitation platform 102 as well. In one example, the printer list is transmitted in response to the state. In another example, the printer list is sent to the print facilitation platform 102 at an earlier time, for example, based on another trigger, such as a timer, when the print client module is initiated, etc. The printer association module 112 causes storage of this information in a printer list database 114. This database can be particular to the computing device 106 or can include information about multiple computing devices.

The print facilitation platform 102 receives the session identifier from the application platform 104 and from the print client module on the computing device 106. The printer association module 112 can associate the session identifier with the application platform 104. Further, the association can include information about a particular port or process using the session identifier. Moreover, the printer association module 112 can associate the computing device 106 and/or print client module with the session identifier. Additionally, the printer association module 112 can determine a list of one or more printers available at the computing device 106. This can be based on a printer list database 114.

The printer list for the session identifier can then be sent to the application platform 104. The communication can reference the session identifier to that the application platform 104 knows that the information is associated with the computing device 106 and the session.

The application server 132 can then continue the printing process. The print process may request information from the user. For example, the user, within the web application, can be requested to choose a printer from the list. In another example, the user can be asked to customize printer settings, for example, page size, paper type, etc. via the web application and web browser. Further, in certain scenarios, the web application can choose the printer automatically. In certain scenarios, the printer may be chosen based on other options associated with the application. For example, if the application is designed to print a 4×6 index card sized image and only one printer has such paper input, the printer can be automatically selected.

The printing process can continue to be performed at the print server 130, which can generate print data. The print data can be customized for the selected printer. Further, input via the web application can be used to customize the print data. In certain scenarios, a print preview can be shown via the web application based on the print data. The print data can include information that, when received at a printer, can be used to print an image. As such, the print data can include information in PCL. The application platform 104 sends the print data back to the print facilitation platform 102. The print data can be sent with identification information (e.g., the session identifier) to associate the print data with the computing device. Further, the identification information and/or the print data can include information as to which one of the printers on the list the print data is associated with and/or was selected for printing.

The communication module 110 receives the print data and/or associated printer selection information, and/or identification information. The print facilitation platform 102 can then send the print data to the print client module of the computing device 106 to print the print data. Printer selection information can be sent so that the print client module knows which printer to print the print data at. In certain embodiments, the selection information can be stored as part of the print data, which can be parsed by the print client module. The print client module can then cause a particular printer 120 to print the print data.

Figure 2:
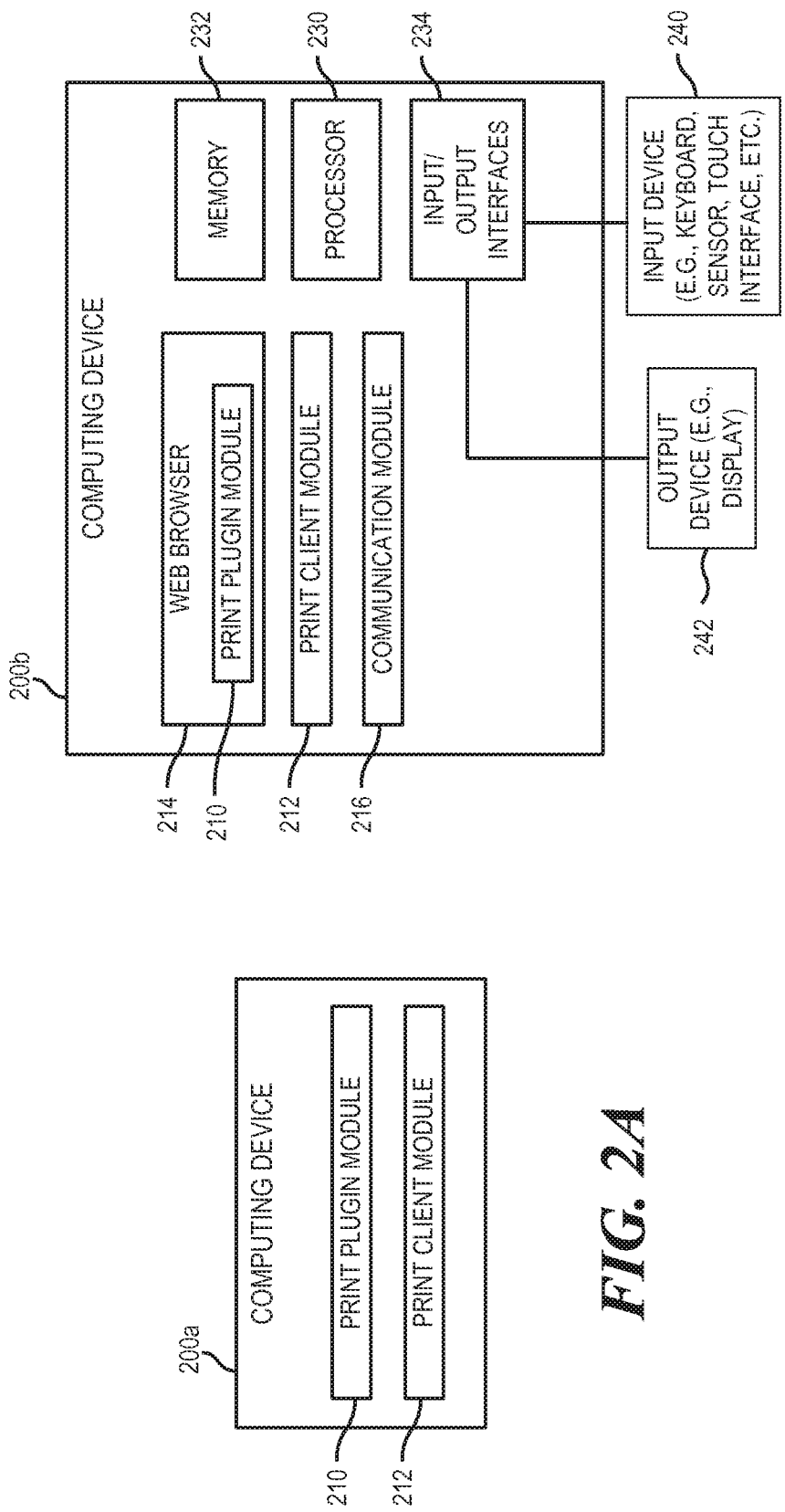
FIGS. 2A and 2B are block diagrams of computing devices capable of using a print facilitation platform to print a document based on a web application running in a web browser, according to various examples.

FIGS. 2A and 2B are block diagrams of computing devices capable of using a print facilitation platform to print a document based on a web application running in a web browser, according to various examples. Computing devices 200*a*, 200*b* include components that can be utilized to use a print facilitation platform to print information from a web application running in a web browser. The respective computing devices 200*a*, 200*b* may be a notebook computer, a desktop computer, a tablet computing device, a wireless device, a workstation, or any other computing device that can be used to access a web application. The computing device 200 can include a print plugin module 210 and a print client module 212. In certain examples, the print plugin module 210 can be installed and executed via a web browser 214. A communication module 216 can also be used to communicate to other devices.

A user can open a web browser 214 while using the computing device 200. The web browser 214 can be used to access a web application, for example, a web application associated with application server 132. The web browser can run the application in a sandbox. In one embodiment, a sandbox is a security mechanism for separating the running of programs. As such, the web application is unable to access other resources on the computing device 200. A sandbox typically provides a controlled set of resources for programs to run. Example sandboxes include ADOBE FLASH sandboxes, JAVA sandboxes, and SILVERLIGHT sandboxes. In certain embodiments, the web application run at the computing device 200 can be considered an applet, a self-contained program that runs in a sandbox, such as a virtual machine or scripting language interpreter.

While using the web application, the web application can be in a state where a print job is initialed. In this scenario, the web application can be associated with a print facilitation platform 102. The web application can check to see if the print plugin module 210 is installed. If the print plugin module 210 is not installed, the print plugin module 210 and/or print client module 212 can be installed. In certain scenarios, the print client module 212 can be installed when the print plugin module 210 is installed. The installation can be completed in a traditional way that the plugins and/or other programs are installed for the browser and/or operating system associated with the computing device 200. As such, the print plugin module 210 can be embedded in the web browser 214. The print client module 212, on the other hand, can be installed outside of the sandbox of the web browser 214, for example, as a program executing in the operating system environment. Further, the print plugin module 210 can be used to communicate messages to the print client module 212. The communications and/or other resources available to the print plugin module 210 may be limited by the web browser 214.

When the web application initiates a print job and the print plugin module 210 and/or print client module 212 are present, the print plugin module 210 can determine the initiation of the print job. Further, the print plugin module 210 can determine a job identifier to associate with the print job. The job identifier can be received from the web application. The print plugin module 210 notifies the print client module 212 of the print job. The notification can include the job identifier.

The print client module 212 can determine a list of one or more printers available to the computing device 200. The printers can include printers installed at the computing device 200. These printers can be installed as network printers and/or as printers connected to a port (e.g., a Universal Serial Bus (USB) port, a parallel port, etc.) of the computing device 200. The list can be determined before the print job notification and/or be based on the print job notification. Further, the list can be sent to a print facilitation platform 102 associated with the web application. In one embodiment, the notification can include contact information for the print facilitation platform 102. Further, in one example, the printer list can include the type of printers connected. In another example, the printer list can further include names or identifiers of the respective printers, status and/or setup information for the respective printers (e.g., media such as paper type available at the printer, capabilities, etc.), or the like. The printer list can be sent, via the communication module 216, to the print facilitation platform 102. The print client module 212 can also send the job identifier to the print facilitation platform 102 via the communication module 216.

In certain embodiments, a job identifier is an identifier that is tied to the print job. The job identifier can be generated by the web application, print plugin module 210, and/or print client module 212. Further, the job identifier can be sent to the print facilitation platform 102 to synchronize identification of the print job between the computing device, the application platform 104, and the print facilitation platform 102.

Based on the sending of the job identifier and/or printer list, the web application running in the web browser 214 can provide additional information about the print job. For example, the web application can provide the printer list to the user to allow the user to select one of the printers available to print at. The user can enter the information. Further, the user may be requested to specify other options. In certain embodiments, the choosing of the printer can allow a print server associated with the application platform 104 to generate print data.

In one example, this print data can be provided to the application to provide a print preview. As such, the web browser 214 can be used to view a print preview of the print data. In another example, the print data can be sent, via the print facilitation platform 102 to the print client module 212. The print client module 212 can receive the print data via the communication module 216. In this example, the user may be provided additional print options, for example, be allowed to preview the print. The print data can include PCL and can be generated to be specific to a selected printer of the printer list. Further, the print data can be customized to a particular page size based on printer settings and/or settings of the web application. The print client module 212 can send the print data to the selected printer.

As noted in the description of FIG. 1, the application platform 104 and print facilitation platform 102 can communicate to determine the print data. Further, the print facilitation platform 102 can provide the printer list via the web application. In certain embodiments, to be more secure about the printer options, the print client module 212 can enumerate the printers and provide printer type information in the printer list. Communications about the printer can refer to the selected enumerated printer. As such, if there are multiple printers of the same type, the enumeration can be used to select a particular printer without providing detailed information about printer settings. The print client module 212 can store the enumerated list to choose the correct printer to send the print data to. In other examples, another identifier (e.g., a printer name) can be used to represent the printers in lieu of the enumeration. The identifier and/or enumeration can be known at the print client module 212 and can be used to track a selected printer.

A processor 230, such as a central processing unit (CPU) or a microprocessor suitable for retrieval and execution of instructions and/or electronic circuits can be configured to perform the functionality of any of the modules 210, 212, 216 described herein. In certain scenarios, instructions and/or other information, such as the printer list, can be included in memory 232 or other memory. Input/output interfaces 234 may additionally be provided by the computing device 200b. For example, input devices 240, such as a keyboard, a sensor, a touch interface, a mouse, a microphone, etc. can be utilized to receive input from an environment surrounding the computing device 200b. Further, an output device 242, such as a display, can be utilized to present information to users. Examples of output devices include speakers, display devices, amplifiers, etc. Moreover, in certain embodiments, some components can be utilized to implement functionality of other components described herein.

Each of the modules 210, 212, 216 may include, for example, hardware devices including electronic circuitry for implementing the functionality described herein. In addition or as an alternative, each module 210, 212, 216 may be implemented as a series of instructions encoded on a machine-readable storage medium of computing device 200 and executable by processor 230. It should be noted that, in some embodiments, some modules are implemented as hardware devices, while other modules are implemented as executable instructions.

Figure 3:
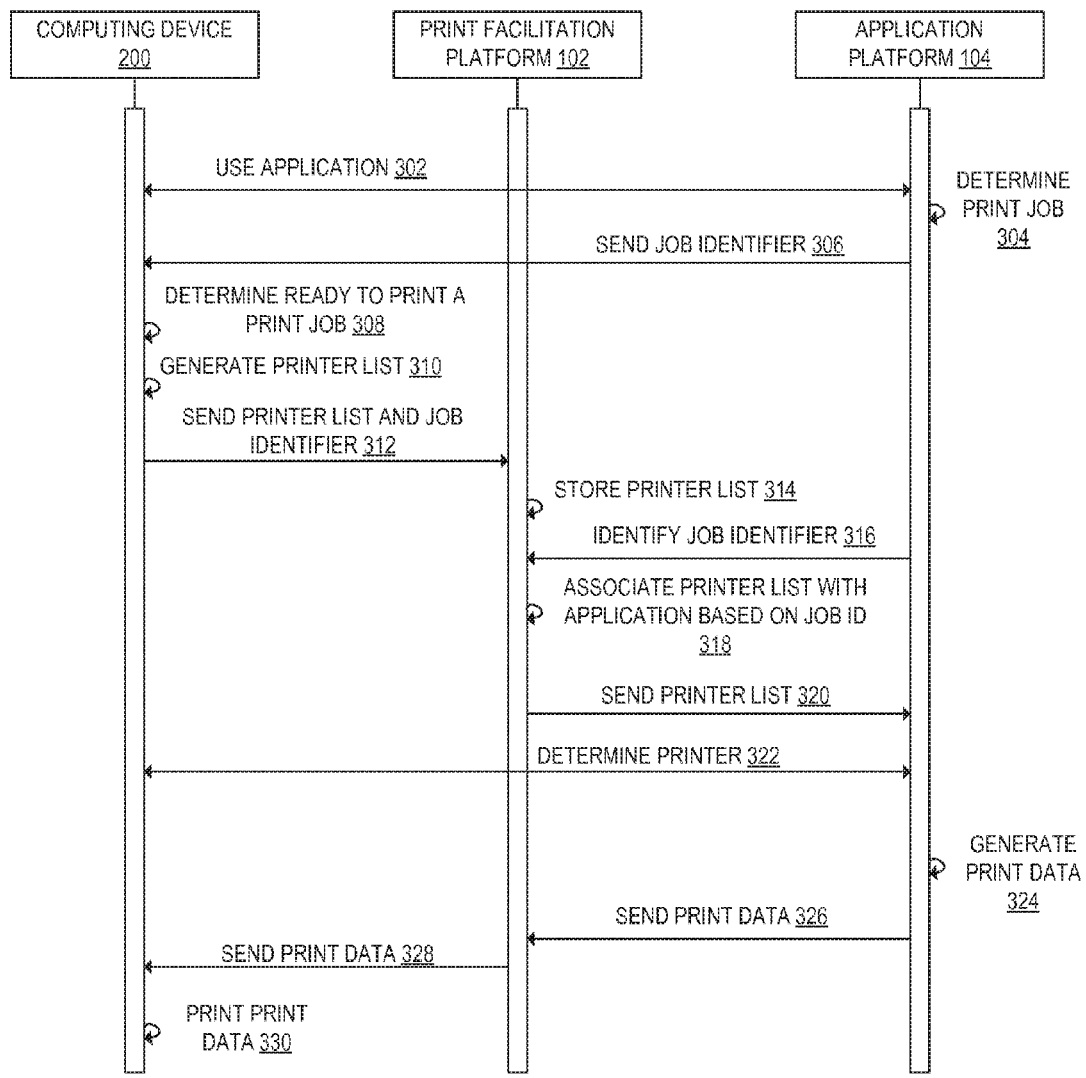
FIG. 3 is a ladder diagram of a method for printing data based on an application running in a web browser, according to one example.

FIG. 3 is a ladder diagram of a method for printing data based on an application running in a web browser, according to one example. Although execution of the method 300 is described below with reference to computing device 200, print facilitation platform 102, and application platform 104, other suitable components for execution of method 300 can be utilized. Additionally, the components for executing the method 300 at each platform may be spread among multiple devices.

Method 300 may start where a user uses the computing device 200 to use an application run via application platform 104 (302). The application can be geared towards printing, for example, the printing of a greeting card, picture, post card, invitation card, etc. Further, the application may be geared towards another subject, but can be used for printing, for example, by having the user select a print button. At 304, the application platform 104 can determine that a print job is to occur. The application platform 104 can generate and send a job identifier associated with the print job to the computing device 200 at 306. The print plugin module 210 can determine that the application is in a state where it is ready to print the print job at 308. The state determination may be based on the reception of the job identifier. As noted above, the print plugin module 210 can notify the print client module 212 about the print job and the print client module 212 can generate a printer list at 310.

The print client module 212 can cause sending of the printer list and the job identifier to the print facilitation platform 102 at 312. As noted above, the preparation and sending of the list can be performed in response to the determination of the print job or at another time that is associated with another trigger (e.g., a timer, initiation of the print client module 212, etc.). Further, the print facilitation platform 102 can receive the printer list and, at 314, store the printer list. As noted above, the printer list can be enumerated and/or include additional information. Further, the printer list can be stored as a different data structure.

At 316, the application platform 104 can transmit the job identifier and the print facilitation platform 102 can receive the job identifier. In certain embodiments, the transmission and/or reception of the job identifier can occur before or after the job identifier is sent to the computing device 200. At 318, the print facilitation platform 102 can associate the printer list with the application based on the job identifier. As such, the print facilitation platform 102 can send the printer list to the application platform 104 at 320.

The application platform 104 can determine a printer to print at 322. In certain embodiments, the printer can be determined based on information received at the computing device 200, for example, based on a selection via the web application. Further, at 324, the application platform 104 can generate print data. As noted, the print data include PCL and may be information can be sent to the selected printer to print the data. The application platform 104 can send the print data to the print facilitation platform 102 at 326. The print facilitation platform 102 can then send the print data to the computing device 200 at 328. The print client module 212 can receive the print data. The print client module 212 is not in the sandbox of the browser and can have access to the printers. As such, the print client module 212 can cause printing of the print data at 330 by sending the print data to the selected printer.

Figure 4:
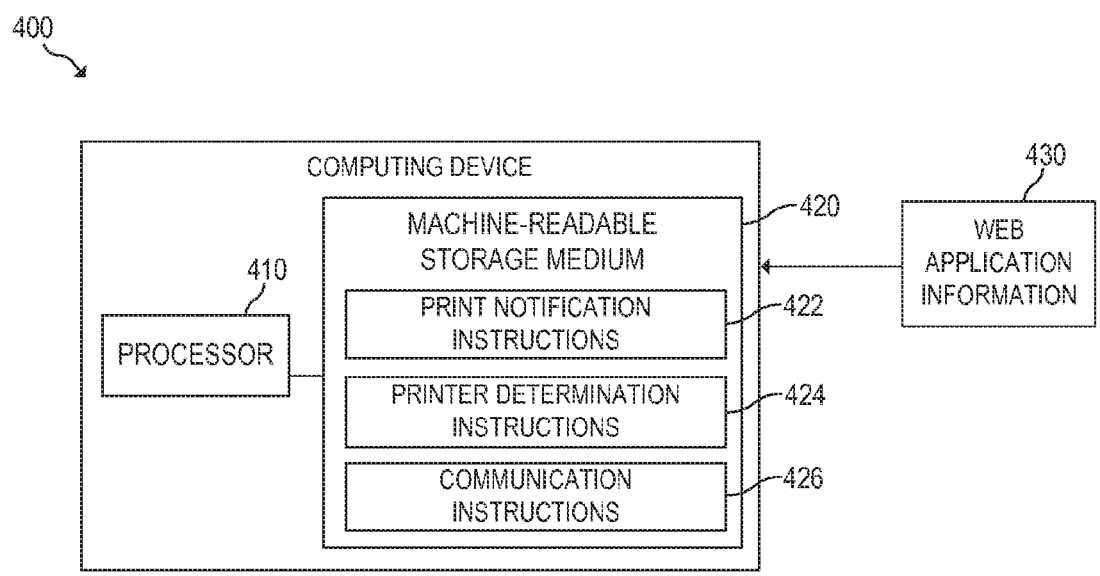
FIG. 4 is a block diagram of a computing device capable of using a print facilitation platform to print data based on an application running in a web browser, according to one example.

FIG. 4 is a block diagram of a computing device capable of using a print facilitation platform to print data based on an application running in a web browser, according to one example. The computing device 400 includes, for example, a processor 410, and a machine-readable storage medium 420 including instructions 422, 424, 426 for implementing a print client module. Computing device 400 may be, for example, a notebook computer, a slate computing device, a portable reading device, a wireless email device, a mobile phone, or any other computing device.

Processor 410 may be, at least one central processing unit (CPU), at least one semiconductor-based microprocessor, at least one graphics processing unit (CPU), other hardware devices suitable for retrieval and execution of instructions stored in machine-readable storage medium 420, or combinations thereof. For example, the processor 410 may include multiple cores on a chip, include multiple cores across multiple chips, multiple cores across multiple devices (e.g., if the computing device 400 includes multiple node devices), or combinations thereof. Processor 410 may fetch, decode, and execute instructions 422, 424, 426 to implement a print client module. As an alternative or in addition to retrieving and executing instructions, processor 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for implementing a print client module.

A user of the computing device 400 can use a web browser to access a web application. The web application can be associated with an application platform and a print facilitation platform. The web application can be placed in a state where the web application desires to begin a print job. The web application can provide a job identifier to the print facilitation platform and the computing device, for example, via a print plugin. In certain examples, the web application can send web application information 430 to the web application executing in the browser sandbox. The plugin can communicate outside of the web browser's sandbox to a print client implemented, at least in part, on instructions 422, 424, 426.

The processor 410 can execute the print notification instructions to receive a notification from the print plugin that the print job associated with the job identifier is being initiated by the web application running in the web browser. The processor 410 can execute printer determination instructions 424 to generate a list of one or more printers available to the computing device. As noted above, the printers on the list can be enumerated and/or sorted using other information, for example, identifiers or names. Further, additional information, such as a page size associated with at least one tray of each of the printers can be determined for each of the printers on the list. This information can be included in the printer list.

Communication instructions 426 can be executed by the processor 410 to send the list and the job identifier to the print facilitation platform associated with the web application. Contact details of the print facilitation platform can be stored as part of the communication instructions 426 and/or can be received from the web application. The print facilitation platform can interact as previously described to retrieve and/or otherwise determine print data. The computing device 400 receives the print data from the print facilitation platform. As noted above, the print data can be associated with one of the printers on the list. The print data can also be based on input received at the web browser. For example, the print data can be based on a printer selection by the user or based on other selections in the web browser. For example, the printer and/or print data can be determined based on a size of paper available at one of the printers. In one example, if the web application is directed to generate a 4×6 or 5×7 printed card, associated printers of the list can be selected based on tray information.

Further, the print data can be previewed at the computing device using the print client before printing. As such, the user can have further control over whether to print the print data. At least a portion of the print data can be sent to the printer for printing. In certain embodiments, a header can be added to the print data to facilitate processing at the computing device 400, for example, by identifying the printer the print data is associated with, for example, using a name, a printer type, a number, etc. As such, a portion of the print data can include printer command language to control the printer.

What is claimed is:

1. A print facilitation platform comprising:
   a processor;
   instructions executable on the processor to:
   receive, over a network from a computing device, a list of printers accessible by the computing device, the list of printers produced by a print application on the computing device in response to a print job initiated by a web application hosted at an application platform and run inside a sandbox of a web browser of the computing device, wherein the print application is associated with a plugin in the web browser, and the print application is outside the sandbox of the web browser;
   send the list of printers to the application platform that hosts the web application;
   receive, from the application platform, print data based on a selected printer from the list of printers, the selected printer selected from the list of printers using the web application run inside the sandbox of the web browser, and
   send the print data to the print application for printing.

2. The print facilitation platform of claim 1, further comprising:
   a printer list database to store the received list of printers.

3. The print facilitation platform of claim 1, wherein the list of printers includes a type of each of the printers accessible by the computing device.

4. The print facilitation platform of claim 1, wherein the instructions are executable on the processor to:
   receive printer selection information associated with the print data from the application platform, the printer selection information comprising an identification of the selected printer; and
   send the printer selection information to the print application.

5. The print facilitation platform of claim 1, wherein the print data is customized based on input to the web browser.

6. The print facilitation platform of claim 5, wherein the print data includes information in a printer command language.

7. The print facilitation platform of claim 1, wherein the instructions are executable on the processor to:
   receive, from the print application, a session identifier associated with use of the web application by the web browser, the session identifier produced based on interaction between the plugin and the web application;
   receive, from the application platform, the session identifier; and
   associate the print application and the application platform with the session identifier.

8. The print facilitation platform of claim 1, wherein the instructions are executable on the processor to:
   receive, from the application platform, a job identifier of a print job initiated by the web application running inside the sandbox of the web browser;
   receive, from the print application, the job identifier with the receiving of the list of printers; and
   associate, based on the job identifier, the list of printers with the web application, wherein the sending of the list of printers to the application platform is responsive to the associating.

9. A non-transitory machine-readable storage medium storing instructions that, if executed by a device comprising a processor, cause the device to:
   receive a notification from a print plugin in a web browser that a print job associated with a job identifier is being initiated by a web application running in a sandbox of the web browser, wherein the instructions are executed outside of the sandbox of the web browser;
   determine a list of printers available to the device;
   send the list of printers and the job identifier to a print facilitation platform associated with the web application; and
   receive print data associated with a selected printer of the list of printers, wherein the print data is generated by the web application running in the sandbox of the web browser and is customized for the selected printer that is selected from the list of printers using the web application.

10. The non-transitory machine-readable storage medium of claim 9, further comprising instructions that, if executed cause the device to:
   send at least a portion of the print data to the selected printer for printing.

11. The non-transitory machine-readable storage medium of claim 10, wherein the print data includes information in a printer command language.

12. The non-transitory machine-readable storage medium of claim 9, wherein the print data further includes information identifying the selected printer.

13. The non-transitory machine-readable storage medium of claim 9, further comprising instructions that, if executed cause the device to:
   determine a page size associated with a tray of each of the printers in the list of printers;
   include, in the list of printers, information of the page size associated with the tray of each of the printers in the list of printers.

14. The non-transitory machine-readable storage medium of claim 13, wherein the selected printer is selected by the web application running in the sandbox of the web browser based on the information of the page size.

15. The non-transitory machine-readable storage medium of claim 9, wherein the print data is generated by the web application based on a user input received at the web browser.

16. A computing device, comprising:
   a processor;
   print plugin instructions executable on the processor to determine initiation of a print job by a web application running in a sandbox of a web browser, wherein the print plugin instructions are embedded in the web browser;
   print client instructions located outside of the sandbox of the web browser and executable on the processor to:
      receive, from the print plugin instructions in response to the print job being initiated, a notification of the print job,
      determine a list of printers available to the computing device,
      send the list of printers to a print facilitation platform associated with the web application, and
      receive, from the print facilitation platform, print data for a selected printer of the list of printers, the selected printer selected from the list of printers using the web application running in the sandbox of the web browser.

17. The computing device of claim 16, wherein the print client instructions are executable on the processor to cause printing of the print data at the selected printer.

18. The computing device of claim 16, wherein the print data is received from the print facilitation platform that received the print data from an application platform hosting the web application.

19. The computing device of claim 16, further comprising the web browser executable on the processor.

20. The computing device of claim 19, wherein the web browser is to present options relating to the printers in the list of printers, the presented options responsive to information provided by the web application running in the sandbox of the web browser.

* * * * *

UNITED STATES PATENT AND TRADEMARK OFFICE
CERTIFICATE OF CORRECTION

PATENT NO. : 9,760,326 B2
APPLICATION NO. : 14/373139
DATED : September 12, 2017
INVENTOR(S) : Brian C. Sparks Page 1 of 1

It is certified that error appears in the above-identified patent and that said Letters Patent is hereby corrected as shown below:

On the Title Page

In Column 2, item (57), Abstract, Line 3, delete "is" and insert -- list --, therefor.

Signed and Sealed this
Thirteenth Day of March, 2018

Andrei Iancu
*Director of the United States Patent and Trademark Office*